No. 625,462. Patented May 23, 1899.
L. PAGET.
ELECTRODE FOR DRY STORAGE BATTERIES.
(Application filed Dec. 30, 1898.)
(No Model.)
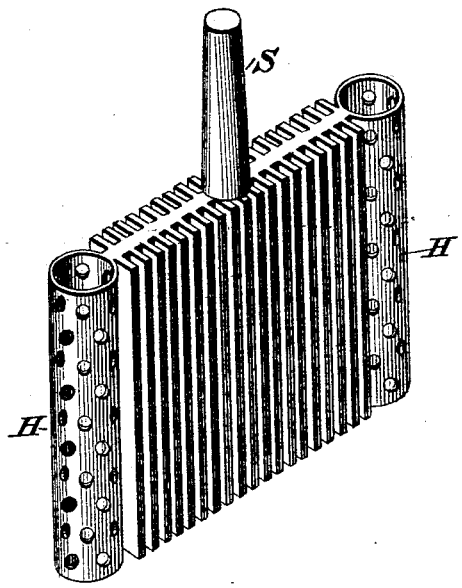
Witnesses.
Wylie Brown
Alfred Van Dolch
Inventor.
Leonard Paget.

UNITED STATES PATENT OFFICE.

LEONARD PAGET, OF NEW YORK, N. Y., ASSIGNOR TO THE RELIANCE LAMP ELECTRIC COMPANY, OF NEW JERSEY.

ELECTRODE FOR DRY STORAGE BATTERIES.

SPECIFICATION forming part of Letters Patent No. 625,462, dated May 23, 1899.

Application filed December 30, 1898. Serial No. 700,725. (No model.)

*To all whom it may concern:*

Be it known that I, LEONARD PAGET, a citizen of the United States, residing at New York, in the county and State of New York, have invented certain new and useful Improvements in Electrodes for Dry Storage Batteries, of which the following is a specification.

My invention relates to the positive electrodes of such storage batteries as have an absorbent material for the electrolyte. It has been observed that when such batteries are charged they evidence the completion of the act of charging by throwing out on the surface of the absorbent some of the electrolyte, and this has been utilized as an indication that the charging is complete; but this discharge of the liquid of the electrolyte has the disadvantage that it is necessary to provide space at the top of the cell in which it may occur, so that the cell may not overflow and cause leakage. Such space is waste otherwise and causes the cell to occupy more room than is necessary with my invention, while it also impairs the "dryness" of the cell that it should be at all liable to such leakage, which dryness is a valuable property for many portative purposes. To obviate this overflow is the essence of my invention.

To carry my invention into effect, I build the positive (charging) electrode with a hollow tube or channel extending from the top to the bottom of the electrode, which channel is at the top level with the mass of the absorbent. When the charging is complete and the electrolyte is thrown out, instead of collecting on the upper surface of the absorbent it flows down the channel to the bottom of the electrode, whence it escapes into the absorbent, or, rather, is carried by the action of the current into the mass of the absorbent. In this way the liquid is pumped back into the absorbent as fast as it is thrown out, and the collection of an excess of liquid is thereby prevented, although the cell may be much overcharged. By this invention careful watching of the cell, so as to remove the cell from the charging-circuit immediately the charging is complete, is rendered unnecessary, and the removal of the cell before it is completely charged through apprehension of causing liability to leakage is also avoided.

My invention is illustrated in the accompanying drawing.

The hollow tube or tubes H are shown as formed externally to the electrode. It is necessary that they be in electrical conductive relation or connection with the electrode and that they be themselves electrically conductive; but it is not requisite that the tubes should be connected to the plate throughout the entire length of the tubes, although here so shown. The tubes are also shown as laterally perforated, although such perforation is not productive of much quicker discharge of the liquid into the absorbent than occurs when escape is allowed to take place only at the bottom of the tube.

The dotted line $m\ n$ shows the level of the absorbent preferred.

Having described my invention, what I claim, and desire to secure by Letters Patent, is—

1. An electrode for dry storage batteries provided with exterior vertical electrically-conducting tube or tubes, which said tube or tubes are in electrically-conductive connection with the electrode, substantially as described.

2. An electrode for dry storage batteries consisting of a working plate and attached thereto in conductive connection therewith a vertical perforated electrically-conducting tube, substantially as described.

LEONARD PAGET.

Witnesses:
 WYLIE BROWN,
 M. E. STODDART.